United States Patent [19]

Erickson

[11] 4,045,683

[45] Aug. 30, 1977

[54] DRIVE CIRCUIT WITH CONSTANT CURRENT

[75] Inventor: Fred William Erickson, Woodland Hills, Calif.

[73] Assignee: Litton Systems, Inc., Beverly Hills, Calif.

[21] Appl. No.: 626,251

[22] Filed: Oct. 28, 1975

[51] Int. Cl.[2] .............................................. H02V 9/02

[52] U.S. Cl. .............................. 307/157; 315/169 TV

[58] Field of Search ................................ 307/157, 40; 315/169 TV; 340/166 EL; 323/1, 4, 21, 80; 178/5.4 EL, 7.3 D; 328/183; 330/15

[56] References Cited

U.S. PATENT DOCUMENTS

| | | | |
|---|---|---|---|
| 3,740,570 | 6/1973 | Kaelin et al. | 307/40 |
| 3,754,181 | 8/1973 | Kreitz et al. | 323/1 |
| 3,770,890 | 11/1973 | Winkler | 178/7.6 |
| 3,821,596 | 6/1974 | Leuck | 315/169 TV |
| 3,886,465 | 5/1975 | Mattfeld | 330/15 |

OTHER PUBLICATIONS

"Monolithic ICS Drive Plasma Displays," *Electronic Engineering*, Jan. 1974, p. 15.

*Primary Examiner*—David Smith, Jr.

*Attorney, Agent, or Firm*—Donald J. Ellingsberg

[57] ABSTRACT

A constant current drive circuit that can be driven directly from the output of a shift register which can find use, for example, in maintaining a constant current through a controlled device such as one or more light emitting diodes (LEDs) to ensure uniform brightness throughout a display surface that includes a plurality of LEDs.

12 Claims, 3 Drawing Figures

Fig. 1
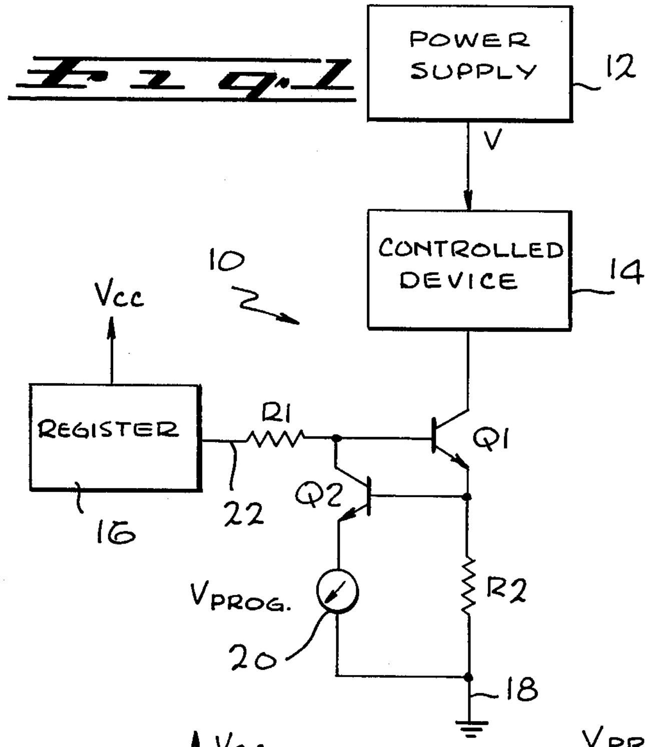
Fig. 2
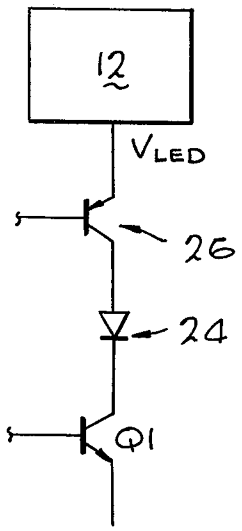
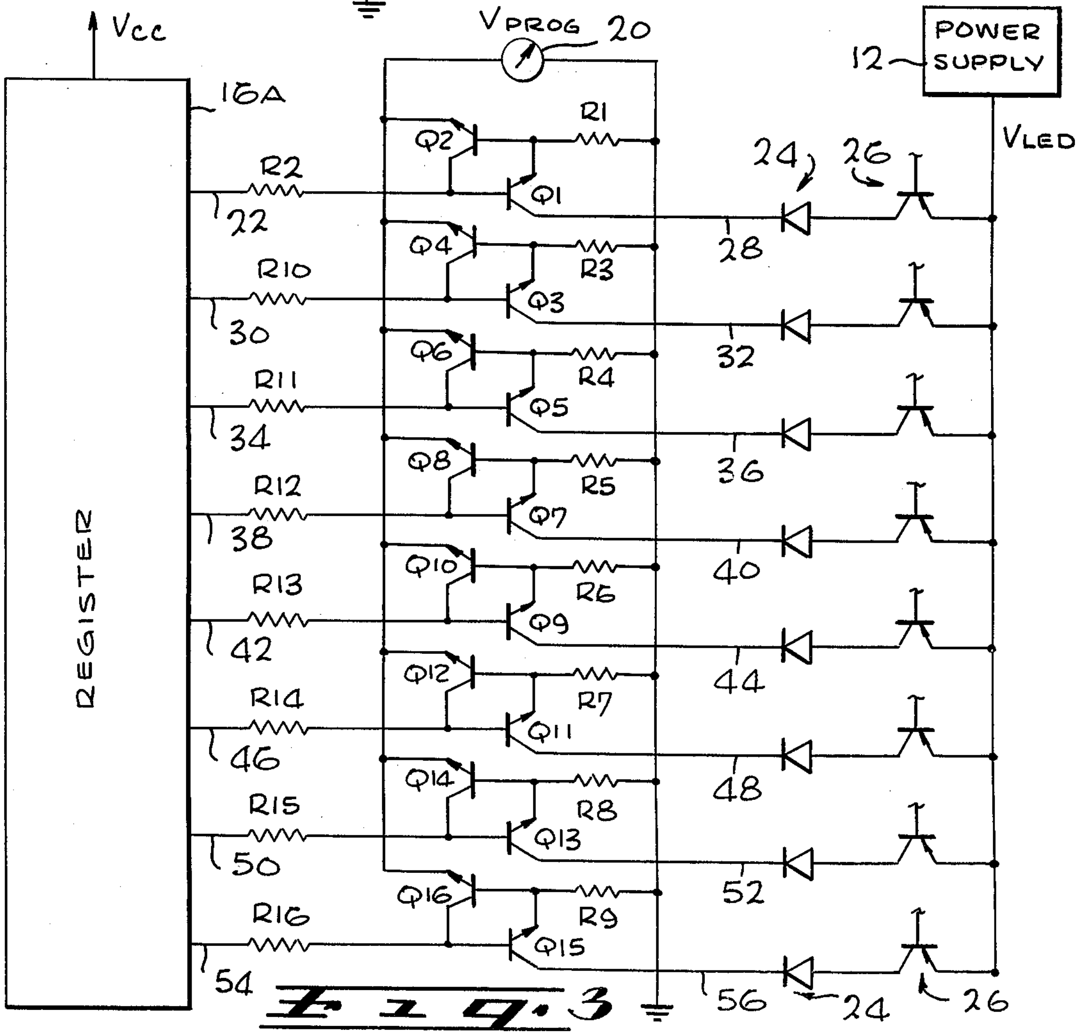
Fig. 3

DRIVE CIRCUIT WITH CONSTANT CURRENT

BACKGROUND OF THE INVENTION

Electronic drive circuits have been developed and used, including drive circuits for light emitting diodes (LEDs); see U.S. Pat. No. 3,740,570 which was granted June 19, 1973, and assigned to the same assignee as the present invention. It is also known that the brightness of an LED is directly related to the electrical current level which energizes the LED. When hundreds of LEDs are used in a display surface, such as an calculator display or a display panel, or the like, the differing energizing currents between the several LEDs prevents a desired uniform brightness through the display surface.

OBJECTS OF INVENTION

Accordingly, it is an object of the invention to provide an electronic drive circuit with constant current.

It is an object of the invention to provide a bistable electronic drive circuit with constant current.

It is an object of the invention to provide a bistable electronic drive circuit with constant current that is selectively determinable.

It is an object of the invention to provide an electronic drive circuit with constant current for one or more LEDs.

It is an object of the invention to provide a bistable electronic drive circuit with constant current, which is selectively determinable, for one or more LEDs to select and maintain a selected lumen output from the LEDs.

SUMMARY OF THE INVENTION

Briefly, in accordance with the invention, a new and improved electronic drive circuit with constant current is provided having first and second sources of electrical potential that are selectively determinable, a current clamping means electrically connected between the first and second sources and drawing a determinable constant current, a controlled device electrically connected between the clamping means and a selected one of the first and second sources where the controlled device draws the determinable constant current, and a signal generating means to selectively enable and disable the current clamping means.

While the specification concludes with claims particularly pointing out and distinctly claiming the subject matter which may be regarded as the invention, the organization and method of operation, together with further objects, features, and the attending advantages thereof, may best be understood when the following description is read in connection with the accompanying drawings.

BRIEF DESCRIPTION OF THE DRAWING

FIG. 1 is an electrical schematic of the electronic drive circuit of the invention.

FIG. 2 is an electrical schematic of a portion of an LED circuit which is controlled by the electronic drive circuit of the invention.

FIG. 3 is an electrical schematic of an LED display circuit wherein the electronic drive circuit of the invention finds use.

DESCRIPTION OF THE INVENTION

Referring to FIG. 1, the electronic drive circuit 10 of the invention has a first source of electrical potential such as power supply 12 that provides an electrical energy input to the circuit. The electrical input from power supply 12 is connected through a controlled device 14 to the collector of a current source transistor Q1. The base of transistor Q1 is connected through resistor R1 to a signal generator 16 which can be a conventional register such as a CMOS shift register. The emitter of transistor Q1 is connected through resistor R2 to a second source of electrical potential which can be ground 18 as shown of the electronic drive circuit 10. It is contemplated that the second source of electrical potential 18 can be a power supply.

A power supply 20 provides a selectively variable third source of electrical energy or potential for the circuit. The power supply 20 is connected to the emitter of a current regulating transistor Q2. The transistors Q1 and Q2, as individual triodes, are connected together as a bistable circuit with the base of transistor Q1 connected to the collector of transistor Q2, and the base of transistor Q2 connected to the emitter of transistor Q1.

Operatively, a selectively variable and constant current output is supplied through the controlled device 14 by the electronic drive circuit of the invention. The current supplied by the drive circuit 10 can be determined by the equation:

$$I \simeq I_{R2} = \frac{V_{BE} + V_{PROG}}{R2}$$

where:

- I is the desired current (amperes) supplied by the drive circuit through the controlled device 14;
- $I_{R2}$ is the current (amperes) through resistor R2;
- $V_{PROG}$ is the voltage supplied by the selectively variable power supply 20 (plus or minus volts);
- $V_{BE}$ is the enabling or cut-in voltage (volts) for the emitter junction of Q2; and
- R2 is the resistance (ohms) of resistor R2.

The constant current is controlled by the output level of the signal generator 16, e.g. a shift register. With a low output voltage or electrical potential at 22 (i.e., zero volts), both Q1 and Q2 are disabled or cut-off and there is no current supplied through the controlled device 14. With a high output voltage at 22 (e.g., $V_{LED} = V_{CC}$), Q1 draws a base current $I_B$ which turns on Q1 so that the resulting collector-emitter current $I_{CE}$ increases with a corresponding increase in the current through R2. The current $I_{CE}$ continues to increase until the current through R2 reaches a level where the corresponding voltage drop across R2 is equal to $V_{PROG} + V_{BE}$. When the voltage drop across R2 is equal to $V_{PROG} + V_{BE}$, Q2 draws a base current $I_B$ which turns on Q2. This holds or stabilizes the voltage across R2 that develops a constant current through R2 and through the collector-emitter junction of Q1 so that the supplied current is held constant. The supplied current can be selectively determined by adjusting the electrical energy input or input voltage of the power supply 20 relative to the input voltage V of power supply 12. If $V_{PROG}$ is adjusted negative relative to V, the current supplied by the drive circuit 10 will decrease in value; if $V_{PROG}$ is adjusted positive relative to V, the supplied current will increase in value.

Referring to FIG. 2, wherein like parts in FIG. 1 are hereinafter identified by the same reference character, the electronic drive circuit 10 of the invention supplies a selectively variable and constant current output through controlled device 14, as described hereinbefore with reference to FIG. 1, which can be a light emitting diode (LED) 24. LED 24 can be one of a plurality of LEDs arranged in a conventional row-and-column display. The LED 24 is connected through a conventional transistor switch 26 to the power supply 12 which supplied $V_{LED}$.

As an illustrative example, one electronic drive circuit 10 for an LED display that includes one or more LEDs such as LED 24 of FIG. 2 requires an output current I of 70 ma. If Q1 has a gain of 100, and output 22 is driven to a potential other than zero by signal generator 16, then Q1 draws base current $I_{BQ1}$ at 2 ma. This turns on Q1 and the collector-emitter current $I_{CE}$ of Q1 starts to increase toward 200 ma. With R2 having a resistance of 10 ohms and Q2 having a base-emitter voltage drop of 0.7 volt, Q2 will draw base current $I_{BQ2}$. Thus turned on, the collector-emitter current $I_{CE}$ of Q2 will hold at 1.3 ma while $I_{BQ1}$ reduces from the initial 2 ma to 0.7 l ma so that the current passing through R2 is held at 70 ma and similarly $I_{CE}$ of Q1 holds at the desired 70 ma. The electronic drive circuit 10 is turned off when the signal generator 16 returns the potential at output 22 to its original value.

The electronic drive circuit 10 of the invention finds particular use in a display having a plurality of LEDs, such as that schematically shown by FIG. 3 wherein like parts in FIGS. 1 and 2 are hereinafter identified by the same reference character. A signal generator 16A, which can be a National Semiconductor 8-bit, serial-to-parallel CMOS shift register (Part No. MM54C164) drives eight independent electronic drive circuits consisting of bistable pairs of transistors Q1–Q2, Q3–Q4, Q5–Q6, Q7–Q8, Q9–Q10, Q11–Q12, Q13–Q14, and Q15–Q16 with base of respective even-numbered ones of the paired transistors connected through respective resistors R1, R3, R4, R5, R6, R7, R8, and R9 to the power supply 20, and with respective odd-numbered ones of the paired transistors connected through respective resistors R2, R10, R11, R12, R13, R14, R15, and R16 to the associated output leads 22, 30, 34, 38, 42, 46, 50, and 54 of signal generator 16A. The leads 28, 32, 36, 40, 44, 48, 52, and 56 are electrically connected respectively through similar LEDs, such as LED 24 of FIG. 2, and similar switch transistors, such as transistor 26 of FIG. 2, to power supply 12. The LEDs can form a panel LED matrix display (not shown) which requires a constant current to all LEDs to ensure uniform brightness throughout the LED display regardless of ambient light conditions. Such LED displays prior to the present invention have experienced the condition where the current through an individual LED will vary as a function of (1) variations in the voltage drop across an LED row and/or column switch (2) variations in the voltage drop across the LED, and (3) variations in the power supply; all of these result in a lack of constant brightness between individual or groups of LEDs in an LED matrix display.

As will be evidenced from the foregoing description, certain aspects of the invention are not limited to the particular details of construction as illustrated, and it is contemplated that other modifications and applications will occur to those skilled in the art. It is, therefore, intended that the appended claims shall cover such modifications and applications that do not depart from the true spirit and scope of the invention.

I claim:

1. A constant current drive circuit comprising:

a. first and second source means of electrical potential, said first and second electrical potentials being selectively determinable, b. current clamping means electrically connected between said first and second source means of electrical potential drawing a determinable constant current, said current clamping means includes

1. bistable control means responsive to said first and second electrical potentials and establishing an electrical current therethrough,

2. a resistor, and

3. a selectively variable third source of electrical potential,

4. said resistor and third source of electrical potential connected in electrical parallel and responsive to said current established by said bistable control means to clamp the electrical level or value of said established current, c. a controlled device electrically connected between said current clamping means and a selected one of said first and second source means of electrical potential drawing said determinable constant current, and d. signal generating means selectively enabling and disabling said current clamping means so that the constant current drive circuit is selectively enabled and disabled.

2. The constant current drive circuit of claim 1 in which said first electrical source means is at an electrical potential greater than said second electrical potential.

3. The constant current drive circuit of claim 2 in which said second electrical potential is zero or ground.

4. The constant current drive circuit of claim 1 in which said bistable control means is a triode means establishing said electrical current.

5. The constant current drive circuit of claim 4 in which said triode means includes a current source transistor and a current regulating transistor, said current source transistor having an emitter connected through said resistor to said source of second electrical potential and a collector connected through said controlled device to said source of first electrical potential, said current regulating transistor having a collector-emitter junction connected between the base of said current source transistor and said third source of electrical potential with the base of said current regulating transistor connected to the emitter of said current source transistor.

6. The constant current drive circuit of claim 1 in which said signl generating means is a shift register.

7. The constant current drive circuit of claim 5 in which said signal generating means includes a signal resistor connected in electrical series with the base of said current source transistor.

8. The constant current drive circuit of claim 1 in which said signal generating means includes a fourth source of electrical potential.

9. The constant current drive circuit of claim 8 in which said signal generating means selectively enables said current clamping meas when said first electrical potential and said fourth electrical potential are substantially equal and greater than said second electrical potential, and selectively disables said current clamping means when said second electrical potential and said fourth electrical potential are substantially equal and less than said first electrical potential.

10. The constant current drive circuit of claim 5 in which said established current is determined by t,130 where $V_{BE}$ is the enabling voltage for base-emitter junction of said current regulating transistor, $V_{PROG}$ is the voltage output of said third source of electrical potential, and R2 is the ohmic resistance of said resistor so that a voltage drop across said resistor equal to $V_{BE} + V_{PROG}$ enables said current regulating transistor thereby stabilizing the voltage drop across said resistor and concomitantly developing said constant and established current through said resistor.

11. The constant current drive circuit of claim 1 in which said controlled device is a light emitting diode.

12. The constant current drive circuit of claim 1 in which said controlled device is a plurality of light emitting diodes electrically connected in parallel.

* * * * *